United States Patent
Marsch

[15] 3,659,471
[45] May 2, 1972

[54] METAL PULLEY WITH DETACHABLE PLASTIC FAN

[72] Inventor: Karl Marsch, Burgermeister-Siegler-Strasse 9,6842, Burstadt, Germany

[22] Filed: Dec. 3, 1970

[21] Appl. No.: 94,885

[30] Foreign Application Priority Data

Dec. 6, 1969  Germany..................P 19 61 299.8

[52] U.S. Cl..............................74/230.3, 74/432, 123/41.11, 123/41.49, 416/241 A
[51] Int. Cl.....................F16h 55/36, F01p 1/02, F01p 7/10
[58] Field of Search ..............74/432, 230.3, 230.01, 230.6; 416/241 A, 229, 230, 180; 123/41.11, 41.49, 41.65

[56] References Cited

UNITED STATES PATENTS

| | | | |
|---|---|---|---|
| 2,550,223 | 4/1951 | Carlin et al. | 74/230.01 X |
| 2,782,722 | 2/1957 | Chubbuck | 416/241 A |
| 2,917,935 | 12/1959 | Haug | 74/230.01 |

FOREIGN PATENTS OR APPLICATIONS

| | | | |
|---|---|---|---|
| 1,234,570 | 5/1960 | France | 123/41.49 |
| 4,421,286 | 9/1966 | Japan | 416/241 A |

Primary Examiner—Leonard H. Gerin
Attorney—Harness, Dickey & Pierce

[57] ABSTRACT

A belt pulley assembly comprises a metal pulley element which is detachably combined with a plastic fan that contains an embedded metal disk having an inner exposed rim that is slotted along with the hub of the pulley element to receive a drive key.

9 Claims, 2 Drawing Figures

PATENTED MAY 2 1972

3,659,471

INVENTOR.
Karl Marsch
BY
Harness, Dickey & Pierce
ATTORNEYS.

METAL PULLEY WITH DETACHABLE PLASTIC FAN

RELATED APPLICATION

This application is based on West German patent application, Ser. No. P 19 61 299.8, filed Dec. 6, 1969. Priority is claimed.

BACKGROUND OF THE INVENTION

The conventional method of producing such belt pulley assemblies consists in working the fan blade rim and the supporting disk element as separate, pressed parts which are spot welded together and then, e.g. by soldering or upsetting, uniting this sub-assembly with the belt pulley proper to obtain an inseparable unit. These belt pulleys have the drawback that in the case of any deformation through a fall or other improper handling, the edges of the fan blade rim will strike against the casing of the electric generator which in turn will cause the entire belt pulley to become spoiled.

In another conventional type of belt pulley assembly, a fan rim with blades made of thermoplastic material is spray-molded over an outer rim of a metal pulley body with a belt groove produced by non-chip forming, again to obtain a fixed and inseparable union. This type of belt pulley is a material improvement in terms of increased durability and simplified production of assembled belt pulleys.

SUMMARY OF THE INVENTION

It is the purpose of this present invention to further enhance the durability and wear resistance of such belt pulley assemblies, while at the same time maintaining as separate and independently exchangeable construction elements both essential parts of the assembly, i.e. the disk element with belt groove and hub as well and the separate fan blade rim.

This purpose is achieved in a preferred form of the invention by a fan rim with hub collar and fan blades, of a plastic material suitable for transfer molding, being spray molded over and around a supporting sheet metal disk with a borehole for the drive shaft and with a catch slot, in such a way that said metal disk is fully enveloped in said material. The hub of the pulley body with belt groove is constructed so that it may be pressed into the hub of the fan blade rim until it touches the inner rim of the supporting disk which later is openly visible in the area of the front surface of the hub of the pulley body with belt groove; the union thus obtained being secure but at the same time detachable. In this way the two essential parts of the assembly are not only capable of being separately produced, but also of being separately stored as spare parts and easily exchangeable to further decrease the production cost of this belt pulley assembly.

Preferably, the fan blade rim should be equipped with cogs on the pulley side opposing the belt groove; said cogs propping against the outer surface of the groove rim. This will secure the mutual positioning of the two essential elements of the belt pulley.

It is also preferred that the fan blade rim with hub and blades be made of a plastic material suitable for transfer molding (spray molding) to be equal to any and all requirements in terms of shape of the fan blade rim. The resilience inherent in the plastic material also makes it possible to obtain a securely clamped seat of the hub collar of the fan blade rim on the hub of the pulley body with groove, without impairing the easy way of pressing-on and of detaching said collar. The drawback frequently observed in plastic material, i.e. the tendency to plastify (modifying its resilient quality) under pressure, is avoided in this construction because of elimination of all such possible pressure areas. This is one of the reasons why the rim of the supporting disk jutting out to the inside remains freely metallic, i.e. is left without any plastic coating, so that metal contacts metal at the surface of contact of the pulley hub with belt groove against the inner rim of the supporting disk.

DESCRIPTION OF THE INVENTION

Figure 1:
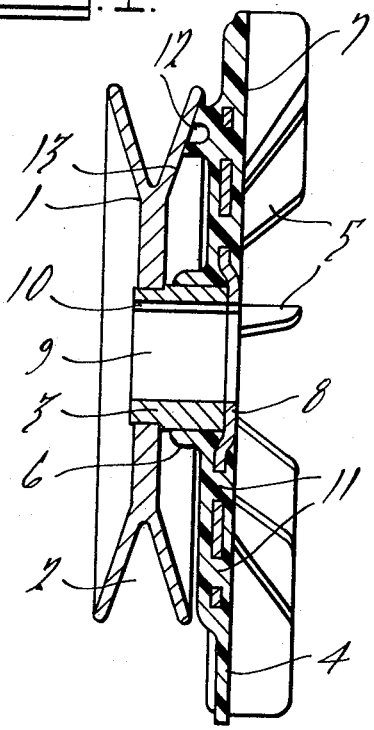
FIG. 1 is a cross section through a belt pulley assembly embodying the invention.
Figure 2:
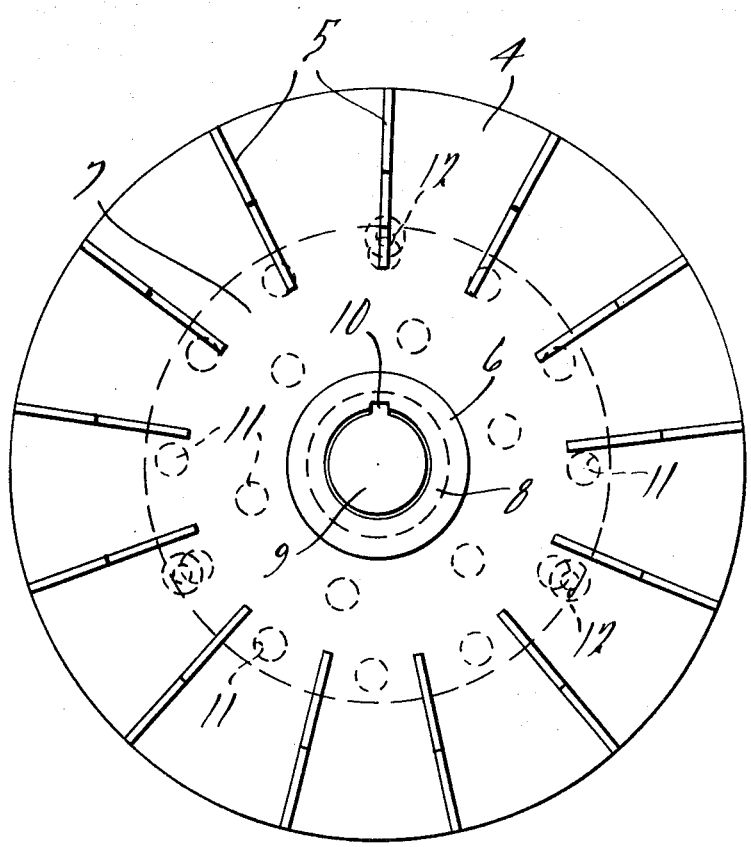
FIG. 2 is a side elevation taken from the right of FIG. 1.

According to FIG. 1 and FIG. 2 the assembled belt pulley includes two essential parts which are united in the pulley but which may be detached from one another and used independently; i.e., the pulley element 1 with belt groove 2 and hub 3, and the fan blade rum 4 with the fan blades 5 and hub collar 6. The pulley element 1 is preferably sheet metal or produced by a non-chip forming process, and permanently united with the hub 3 by conventional means.

The fan blade rim 4 is made from non-metallic plastic material suitable for transfer molding. It is produced by spraying the rim with blades 5 and hub collar 6 over and around the sheet metal disk 7. By this process the sheet metal disk 7 is entirely enveloped within the fan blade rim 4 except its non-coated inner rim 8, the disk thus serving as a support for the fan blade rim. The hub 3 and the sheet metal disk 7 have the same bore diameter 9 for the drive shaft (not shown in the illustration) and the same key slot 10 for attachment to the drive shaft. In this way the sheet metal disk 7 serves as driver disk for the fan blade rim 4, the material of which fills the recesses 11 in the sheet metal disk 7.

When assembling the two essential elements into the finished belt pulley, the fan blade rim 4 with its hub collar 6 is pressed onto the outer circumference of the hub 3 of pulley element 1 until the front surface of hub 3 comes into contact with the non-coated inner rim 8 of sheet metal disk 7. In this end position the cams 12 disposed over the surface of fan blade rim 4 opposed to pulley element 1 come into contact with the outer surface 13 of the rim of belt groove 2, supporting the fan blade rim 4 against said surface.

The invention therefore provides an assembled belt pulley and fan for the use in appliances such as electric generators for automotive vehicles that includes a sheet metal pulley element with a belt groove preferably produced by a non-chip forming process, and having a hub, and a fan blade rim characterized by the following features: the fan blade rim 4 has a hub collar 6 and fan blades 5 that are spray-molded over and around a supporting sheet-metal disk 7, that has a bore hole 9 for the drive shaft and a driver key notch 10, to entirely envelop said sheet metal disk 7. The hub 3 of pulley element 1 with belt groove 2 is then pressed in a secure but detachable manner into the hub collar 6 of fan blade rim 4 to a depth where the front of the hub 3 of pulley element 1 with belt groove 2 comes into contact with the non-coated rim 8 of the supporting disk 7. In addition the fan blade rim 4 has cams or projections on the surface opposing the pulley element 1 in contact with belt groove member 2 in such a way that said cams 12 support said fan blade rim 4 against the outer surface 13 of the belt groove rim. As indicated, the fan blade rim 4 with hub collar 6 and blades 5 are preferably made of plastic, non-metallic material suitable for transfer molding.

This invention is not restricted to the construction example as above described and herein illustrated. Different construction models may be adapted to suit the individual applications. The advantages of this invention—aside from facilitating the production of such belt pulleys and increasing their durability—also include facilitating of interchangeability of the construction elements of such assemblies, the possibility of separate use of each of these elements, and the practical warehousing of each of said elements separately from one another.

I claim:

1. A belt pulley assembly comprising a metal pulley member having a belt groove therein and a hollow hub and a non-metallic plastic material fan member, said fan member comprising a monolithic body having a hollow collar portion and a metal disk embedded in the body having an inner annular rim projecting radially inside of the collar portion, said hub being telescoped inside the collar to a position adjacent said inner rim.

2. A device as set forth in claim 1 wherein said hub and inner rim have a drive key slot means formed therein.

3. A device as set forth in claim 1 wherein said members are detachably connected together.

4. A device as set forth in claim 3 wherein said hub and inner rim have aligned drive key slots therein.

5. A device as set forth in claim 1 including means interconnecting said metal disk and plastic body to transmit torque from the disk to the body.

6. A device as set forth in claim 5 wherein said means comprises recesses in the metal disk, the plastic of the body filling said recesses.

7. A device as set forth in claim 6 including means providing aligned key slots in the hub and inner rim.

8. A device as set forth in claim 7 wherein said hub is detachably mounted in the collar.

9. A device as set forth in claim 1 wherein said body has lateral stabilizing projections engaging said pulley member.

* * * * *